A. S. PROKOPOVITSH.
BANK CHECK.
APPLICATION FILED OCT. 11, 1920.
1,431,038.
Patented Oct. 3, 1922.
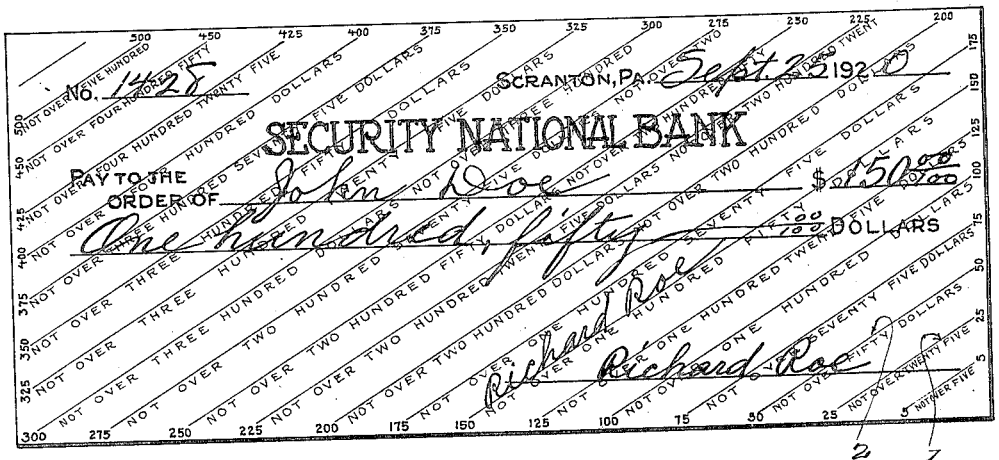
Andrew S. Prokopovitsh,
INVENTOR.
ATTORNEYS Patented Oct. 3, 1922.

1,431,038

UNITED STATES PATENT OFFICE.

ANDREW S. PROKOPOVITSH, OF DICKSON CITY, PENNSYLVANIA.

BANK CHECK.

Application filed October 11, 1920. Serial No. 416,281.

*To all whom it may concern:*

Be it known that I, ANDREW S. PROKOPOVITSH, of Dickson City, in the county of Lackawanna and State of Pennsylvania, have invented certain new and useful Improvements in Bank Checks; and I do hereby declare the following to be a full, clear, and exact description of the invention, such as will enable others skilled in the art to which it appertains to make and use the same.

My object is to provide an improvement in bank checks, whether draft form checks, drafts or customers' drafts in writing, whereby the money amount indicated by the original maker is virtually proof as against alteration.

Primarily I seek to obtain this object by simplified means requiring no alteration in the size or shape or the original printing of an ordinary instrument.

In the drawing my improvements are shown, applied to an ordinary draft form bank check previously printed to indicate the name of the bank and its location, and the number of the check together with the usual blank spaces for the date and amount (in words and numerals) and the signature, at the usual place. In other words the check in its original form is the ordinary draft form check in common use.

My improved features comprise a series of lines printed across the face of the check transversely, each line constituting a place for the maker's signature according as it may indicate the limitation upon the amount for which the check is drawn, and each line having an appropriate inscription in letters or numerals, or both, indicating that limitation. As illustrated, line 1 is for a sum not exceeding twenty-five dollars. Words to that effect appear adjacent the line and the corresponding numerals are shown arranged at each end. Line 2 is for an amount not over fifty dollars and so on through the series which may progress according to any predetermined unit.

I have indicated the maker's name at the usual place in the lower right hand corner as well as on the line most nearly corresponding to the amount of the check.

In addition to the advanage of enabling the improved features to be applied to any existing check or draft, as before stated, it will be noted that a check having my improvements is virtually proof against being altered or "raised". One may see at a glance the unit of progression of the lines, in the present instance twenty-five. Consequently if the attempt be made to raise the amount of the check illustrated from $150. to $200 for instance, it will be necessary to correspondingly alter the words and numerals of every other line on the check. The probability of this being successfully accomplished is remote.

Furthermore, the check itself in its original form is the kind in general use in American banking, with the maker's name at the lower right hand corner. This is the point to which a bank teller first refers in determining the genuineness of the check. In other words the check proper is not altered. When the auxiliary feature is added, as may be done by printing or a rubber stamp, at the will of the maker, the bank teller, having determined the genuineness of the signature at the usual point, may quickly glance at the repetition on the transverse line. A person with dishonest motive seeking to forge the check must successfully copy the signature at two places.

My improvements may appear in printing of modified tone so as to not confuse the face of the check and may be added without material increase of cost.

I claim as my invention:

The combination with a draft form bank check or draft, having a space for the maker's name at the lower right hand corner, capable of ordinary use without auxiliary means, of auxiliary means printed upon the face of the check or draft for limiting the amount written upon the instrument, comprising a series of lines across the face of the check inscribed in numerical progression according to a predetermined unit, each line having characters designating an amount, the line limiting the amount for which the check is drawn being adapted for a duplication of the signature of the maker.

In testimony whereof I have signed this specification.

ANDREW S. PROKOPOVITSH.